V. PRICE.
Wheel Tire.
No. 89,835.
Patented May 4, 1869.
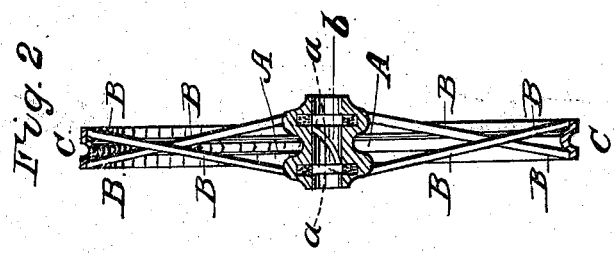
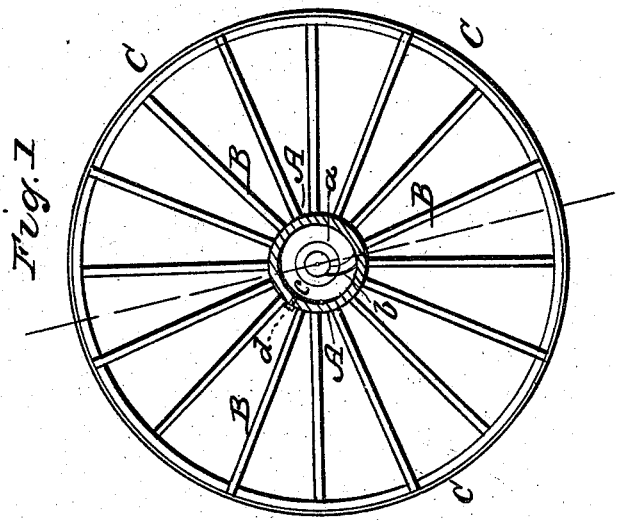
WITNESSES
INVENTOR

United States Patent Office.

VIRGIL PRICE, OF NEW YORK, N. Y.

Letters Patent No. 89,835, dated May 4, 1869.

IMPROVEMENT IN CARRIAGE-WHEELS.

The Schedule referred to in these Letters Patent and making part of the same.

*To all whom it may concern:*

Be it known that I, VIRGIL PRICE, of the city, county, and State of New York, have invented a new and improved Wheel for Vehicles; and I do hereby declare that the following is a full, clear, and exact description thereof, which will enable others skilled in the art to make and use the same, reference being had to the accompanying drawings, forming part of this specification, in which—

Figure 1 represents a face view, partly in section, of my improved wheel for vehicles.

Figure 2 is a vertical transverse section of the same.

Similar letters of reference indicate corresponding parts.

The object of this invention is to construct a light wheel, which can be used on velocipedes and other vehicles, and which will combine all the requisite strength, with great lightness and simplicity of construction.

The present invention consists in the application of a corrugated tire, made of sheet or other thin metal, which is so shaped that it is higher at or near the edges than in the middle, and which is, at or near both edges, supported by a double set of spokes, that project from the hub of the wheel.

By corrugating it, thin metal, otherwise weak, will receive the requisite strength. But the object of the corrugation would be lost if the tire, or rim, could not be supported and braced near its edges by the aforesaid double sets of spokes. Thereby a wheel of great strength is produced by very light and apparently weak material.

A, in the drawing, represents the hub;

B, the spokes; and

C, the metal rim, or tire of my wheel.

The tire is made of sheet, or thin metal, corrugated, or moulded to form a cross-section, similar to that indicated in fig. 2, that is to say, depressed in the middle, and elevated at or near the edges.

From the hub project two sets of spokes towards the sides of the rim, so that they support the same near its opposite edges, as shown in fig. 2.

I prefer to have the two sets of spokes cross each other, as shown in fig. 2, whereby a stronger and more effective bracing of the rim is produced.

The spokes may be tubular or solid, as may be desired, and may be fastened to hub and rim in suitable manner.

The hub is provided with two internal grooves, $a\ a$, which may be connected by a channel, $b$, and to one or both of which an aperture, $c$, from the outside, may lead.

Such aperture, or apertures, can be closed by a screw, or other suitable plug, $d$.

The grooves are both to be filled with sponge, cotton, or other equivalent material, whereby two annular oil-packings are provided.

The lubricating-matter is introduced through the aperture $c$, and is then retained by the sponge or cotton, to be given off to the axle when the wheel is in motion.

If but one aperture is provided, the other groove, not connected with it, will receive its lubricating-matter through the channel $b$.

By the two grooves, the inner surface of the hub is divided into three distinct and short bearing-surfaces, whereby the friction is considerably reduced.

I claim as new, and desire to secure by Letters Patent—

The corrugated metallic rim, or tire C, of a wheel, when so shaped that it is higher at or near the edges than toward the middle, and when supported, at or near the edges, by two separate sets of spokes, projecting from the same hub, substantially as herein shown and described.

VIRGIL PRICE.

Witnesses:
FRANK BLOCKLEY,
ALEX. F. ROBERTS.